Figure 1:
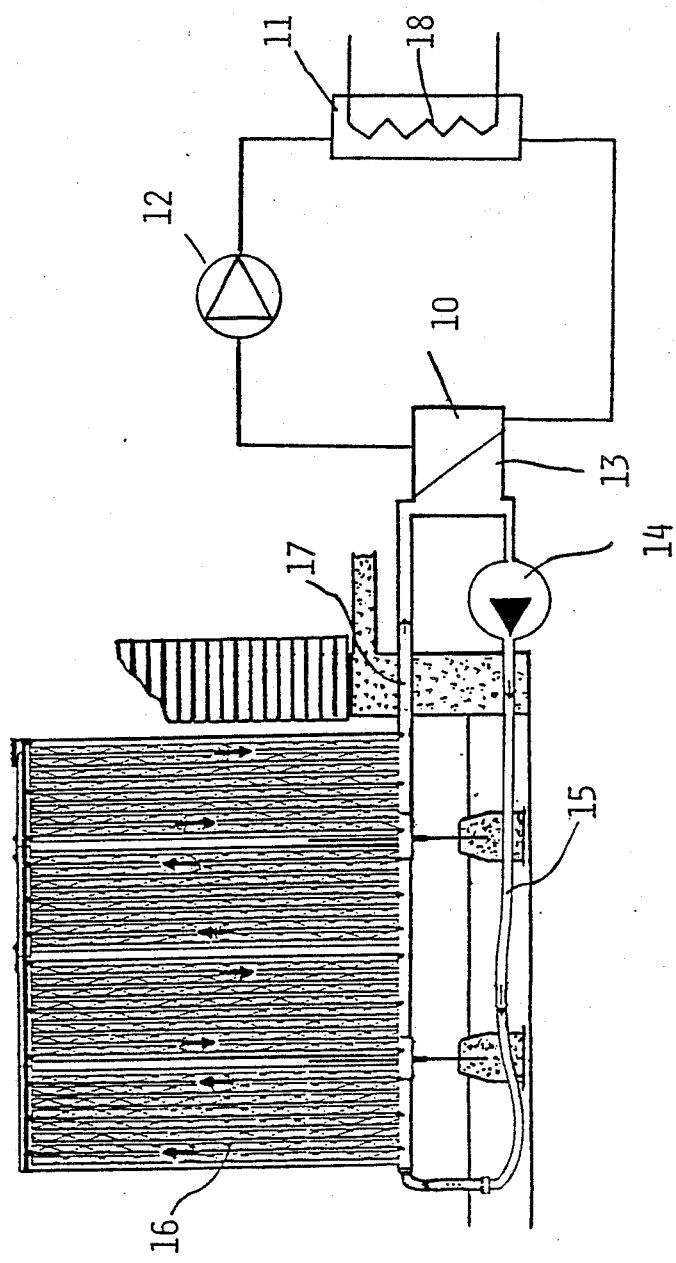

United States Patent [19]

Von Platen

[11] Patent Number: 4,928,752
[45] Date of Patent: May 29, 1990

[54] METHOD FOR RECOVERING LATENT HEAT FROM A HEAT TRANSFER MEDIUM

[76] Inventor: Magnus H. Von Platen, Lupingatan 8, S-233 00 Svedala, Sweden

[21] Appl. No.: 411,456
[22] PCT Filed: Mar. 21, 1988
[86] PCT No.: PCT/SE88/00140
§ 371 Date: Sep. 26, 1989
§ 102(e) Date: Sep. 26, 1989
[87] PCT Pub. No.: WO88/07161
PCT Pub. Date: Sep. 22, 1988

[30] Foreign Application Priority Data

Mar. 20, 1987 [SE] Sweden ............... 8701157

[51] Int. Cl.⁵ .................... F25D 17/02
[52] U.S. Cl. ................ 165/104.17; 62/96; 62/99; 62/118; 62/114; 62/238.6; 62/434; 62/435; 237/2 B
[58] Field of Search .......... 237/2 B; 165/104.17; 62/59, 114, 99, 118, 119, 434, 435, 430

[56] References Cited

U.S. PATENT DOCUMENTS 3,670,522  6/1972  Bresin ................... 62/435
4,509,344  4/1985  Ludwigsen et al. ...... 165/104.17
4,584,843  4/1986  Pronger, Jr. ............ 165/104.17

Primary Examiner—Albert W. Davis, Jr.
Attorney, Agent, or Firm—Merchant, Gould, Smith, Edell, Welter, & Schmidt

[57] ABSTRACT

The invention relates to a method for recovering latent heat from a heat transfer medium comprising a mixture of water and alcohol, which is circulated through a heat collector and a heat exchanger for heat exchange with the evaporator in a refrigerating circuit. The heat transfer medium is sucked from the heat exchanger to provide an underpressure for atomization of the heat transfer medium with following generation of bubbles in the heat transfer medium, ice crystals then being precipitated and the ratio of water and alcohol thus being changed, the heat transfer medium with ice crystals entrained therein then being supplied to the heat collector under overpressure.

1 Claim, 1 Drawing Sheet

METHOD FOR RECOVERING LATENT HEAT FROM A HEAT TRANSFER MEDIUM

The invention relates to a method for recovering latent heat from a heat transfer medium which is circulated through a closed system through a heat collector and a heat exchanger for heat exchange with the evaporator in a refrigerating circuit.

More particularly, the invention relates to a method for supplying a larger amount of heat energy via the flow of heat transfer medium than that corresponding to the temperature rise only, i.e. delta T, or the sensible heat. This means that the latent heat under some operational conditions is so large that the heat energy will be recovered from the heat transfer medium without delta T, i.e. substantially at constant temperature of the circulating heat transfer medium.

The efficiency of a heat pump has been completely independent of the temperature level of the heat source, e.g. the temperature of the outdoor air. Therefore, it has been considered for a long time that deep-drilled wells have been suitable heat sources although great pump power has to be supplied. However, for heat pumps having the outdoor air as the heat source, the efficiency so far has decreased drastically with decreasing temperature of the outdoor air. Then, other heat sources have been utilized for supplying peak energy, which means increasing heating costs.

The present invention relates to a method for increasing the efficiency of a heat pump or a refrigerating machine, particularly at low temperatures, although the method of the invention is operative as soon as the evaporation temperature is about 0° C., depending on such factors as flow rate and pressure.

According to the invention, the method of the kind referred to above is characterized in that the heat transfer medium, comprising a mixture of water and alcohol, is sucked from the heat exchanger to provide an underpressure for atomization of the heat transfer medium with following generation of bubbles in the heat transfer medium, ice crystals then being precipitated and the ratio of water and alcohol thus being changed, the heat transfer medium with ice crystals entrained therein then being supplied to the heat collector under overpressure.

In the heat transfer medium, commonly called brine, comprising a mixture of water and alcohol, the alcohol preferably consists of methanol.

In the process following the generation of the bubbles, water and alcohol are separated and the water in the form of vapour bubbles or water droplets will be condensed and can form ice crystals. When water and alcohol are separated, heat energy will be consumed which will be taken from the heat transfer medium. However, this heat energy will be replaced by ice formation energy and will be recovered when alcohol and water are mixed again.

The heat transfer media (brines) used today commonly include an antifreezer such as glycol or a salt solution and are circulated in the reversed direction, i.e. the medium is supplied under overpressure to the heat exchanger and is sucked from the heat collector.

The invention can be applied in different fields of the refrigeration technique, e.g. in refrigerating plants, artificial ice tracks, where it is possible by applying the invention to transfer at a specific flow and delta T a greater amount of heat through the system.

Since ice crystals are generated when applying the method of the invention, a given tube dimension can be used for a far greater refrigeration capacity, but due to the generation of ice crystals it is of course also possible to store cold. This can be of interest when the price of electric power is lower in the night-time than in the daytime. Differentiated tariffs for electric power can make it advantageous to generate the cold for air conditioning already the preceding night and then store ice crystals in a tank.

In order to explain the invention in more detail this will be described with reference to the accompanying drawing showing a plant including a heat pump system for working the method of the invention.

The plant shown in the drawing is of the type air-water-water, which means that the outside air is the heat source proper from which the heat energy is exchanged to the heat transfer medium, comprising substantially water, and that the heat energy when raised to a suitable level is supplied to the object to be heated via a heat-carrying water system.

The plant comprises an evaporator 10 forming part of a refrigerating system having also a condenser 11 and a compressor 12 pumping a refrigerant such as freon in a closed circuit through the condenser and the refrigerator, cold being generated in the evaporator and heat being recovered in the condenser in a manner well known in the art. The condenser 11 is combined with a heat exchanger 18 through which water is circulated in heat-exchanging relationship with the refrigerant for carrying away the recovered heat to the object to be heated.

The plant also includes a circulation system for a heat transfer medium such as a brine comprising a mixture of water and alcohol, preferably methanol, and this circulation system comprises a heat exchanger 13 in heat-exchanging relationship with the evaporator 10, a pump 14, the suction side of which is connected to the heat exchanger 13 and the pressure side of which is connected to an inlet conduit 15 of a heat collector 16 the outlet conduit 17 of which is connected to the heat exchanger 13. The brine is circulated through the heat collector 16 as indicated by arrows.

The circulation pump 14 generates a pressure drop in the system, since the heat exchanger 13 provides a rather great pressure drop. In the heat collector 16, a certain overpressure will be obtained.

The freezing temperature of the heat transfer medium is dependent on the ratio of alcohol and water, the alcohol content being as high as possible considering the risk of freezing. For heat collectors the lowermost outdoor temperature at the place of installation determines the ratio of the mixture of alcohol and water. If a brine contains e.g. 60% water and 40% methanol, the freezing temperature will be −35° C.

Since the circulation pump 14 according to the invention is connected at the pressure side thereof to the heat collector 16 and at the suction side thereof to the heat exchanger 13, an underpressure will be obtained in the heat exchanger facilitating the generation of bubbles and atomization of the heat transfer medium as is required in order that ice crystals will be produced at the cold surfaces of the heat exchanger, said surface being cooled by means of the evaporator 10. To some extent the bubbles will also be cooled by the expansion to which they are exposed.

A homogenization of the heat transfer medium will start when such medium has passed the circulation pump 14, because the pressure ratio then will be changed and still existing bubbles thus will implode. Under the influence of the heat recovery in the heat collector 16 the ratio of alcohol and water will be changed and a complete homogenization will take place when all heat of mixture has been supplied. Therefore, there is a complete heat balance in the mixture when the heat transfer medium arrives at the heat exchanger 13.

The total effect of the recovery of the latent heat thus is ice formation energy +mixing heat. This latent heat accordingly is related not only to delta T and flow over the heat collector as in normal heat exchange and recovery of sensible heat.

When underpressure is created in a flowing liquid, cavitation phenomena arise. Such phenomenon can arise at sharp corners in the surface enlargements of the evaporator, which retards the flow, or in several small passages in a plate heat exchanger in the same manner as cavitation arises in the underpressure at water propellers or pump impellers. In the heat exchanger of the plant for working the method of the invention the cavitation phenomena are utilized in order to evaporate part of the heat transfer medium so as to form an infinite number of small vapour bubbles which are cooled in the fand zone by expansion but also by the cold heat exchanger walls against which such bubbles rub.

The vapour bubbles provide no supply of energy; on the contrary they require heat energy which primarily is taken from the ice formation heat in the heat transfer medium. When the evaporated material is "rubbed" against the cold heat exchanger surface, the vapour will condense and at the same moment will be transformed by freezing to a very small ice crystal. The generation of ice will take place first in the outer zones of the small bubbles, because the expansion of the bubble contributes to the cooling to some extent. At this stage, the temperature drop thus will be retarded by an increasing formation of ice, and it can be said that ice formation heat is supplied and is recovered in the heat exchanger. It is substantially this latent heat which is referred to and which is thus recovered in the heat exchanger, but also at a later stage mixing heat will be supplied which also provides a heat addition directly in the heat transfer medium on the pressure side of the flow, i.e. after the circulation pump 14.

In order to recover the mixing heat from the mixture of e.g. methanol and water it is, of course, necessary that a separation has initially taken place as in this case when the ice crystals are formed in the heat exchanger, which means that the water has been separated from the heat transfer medium at least to some extent. The required heat for this process also is obtained from an increased ice formation and not by a temperature decrease.

The evaporation via the generation of bubbles wherein the flow rate and a low pressure partly govern the process, and the following condensation thus does not result in excess energy, but the processes are "tools" for the formation of ice in a heat transfer medium with an antifreezing agent protecting against freezing at very low temperatures. An atomization of the heat transfer medium has taken place.

Recovery of the ice formation heat in the heat exchanger and the mixing heat in the heat transfer medium does not require that temperatures below zero exist in the heat transfer medium outside the heat exchanger. However, it is necessary that the metal surfaces in the heat exchanger are at 0° C. or a lower temperature. This temperature can be adjusted by means of the underpressure in the heat exchanger, which means substantially that the evaporation temperature governs the formation of latent heat.

The formation of ice directly in the heat recovering heat exchanger provides, of course, large amounts of energy at a temperature of the heat transfer medium which is nearly constant. When water is freezing, about 336 kJ/kg are obtained which should be conferred with the amount of energy obtained when the temperature of water is decreased 1° C., which is about 4.2 kJ/kg.

At a specific flow, substantially more energy can be transported, which is of great value in all refrigerating systems. It is, of course, also possible to store cold by means of the ice crystals which have a large energy density. As far as heat pump systems are concerned, the operation thereof will be dependent to a less degree on the outdoor air temperature or the temperature level of another heat source. The same effect as that obtained when using an air collector, can be obtained via e.g. sea water as the heat source by means of an indirect system (brine). The air heat collector then is replaced e.g. by a heat-collecting hose (sea collector) which is filled with the heat transfer medium.

A consequence of the process described above is in fact that water (ice crystals) is separated from the mixture of water and alcohol in the heat transfer medium, which means that the mixing ratio is changed. This separation of water from alcohol normally "costs" heat energy or an energy amount as large as that obtained at the following mixing. However, in the process described herein, the supply of energy is obtained via an increasing ice formation in the heat exchanger. The temperature drop thus will be retarded, but nevertheless the mixing heat will be obtained at the pressure side of the circulation pump.

At relatively low temperatures at the heat absorption side there are also obtained low evaporation temperatures and thus low temperature on the metal surfaces of the heat exchanger. Then, operational conditions can be obtained wherein the total cooling power is covered by the ice formation heat. Under such operational conditions, the heat absorption will be related completely to latent heat without the presence of sensible heat in amounts that can be measured. The very small ice crystals will be melt without a real rise of the temperature.

Great advantages as conferred with conventional brine systems are obtained by the method of the invention by the temperature of the heat transfer medium particularly at low temperatures, being closer to the temperature of the heat source, e.g. the temperature of the outdoor air, and the evaporation temperature upstream of the compressor being correspondingly higher. Summarizing, this means a higher efficiency at a given outdoor temperature or temperature of the heat source and, to a large extent, a reduced dependency on the temperature. As far as the heat collector is concerned, very high K values (W/m$^2$, K) will be obtained.

What is claimed:

1. Method for recovering latent heat from a heat transfer medium which is circulated through a closed system through a heat collector and a heat exchanger for heat exchange with the evaporator in a refrigerating circuit, characterized in that the heat transfer medium, comprising a mixture of water and alcohol, is sucked from the heat exchanger to provide an underpressure for atomization of the heat transfer medium with following generation of bubbles in the heat transfer medium, ice crystals then being precipitated and the ratio of water and alcohol thus being changed, the heat transfer medium with ice crystals entrained therein then being supplied to the heat collector under overpressure.

* * * * *